United States Patent [19]
Tamura

[11] Patent Number: 5,404,390
[45] Date of Patent: Apr. 4, 1995

[54] PORTABLE TELEPHONE SET

[75] Inventor: Yoshiharu Tamura, Tokyo, Japan

[73] Assignee: NEC Corporation, Tokyo, Japan

[21] Appl. No.: 169,202

[22] Filed: Dec. 20, 1993

[30] Foreign Application Priority Data

Dec. 18, 1992 [JP] Japan ................................. 4-338392

[51] Int. Cl.6 ........................................... H04M 11/00
[52] U.S. Cl. ....................................... 379/58; 379/433; 455/97; D14/138
[58] Field of Search ........................ 379/58, 433, 434; 455/89, 90, 97; D14/137, 138, 230, 238; 343/702, 720

[56] References Cited

U.S. PATENT DOCUMENTS

D. 345,356  3/1994  Ando et al. ...................... D14/138
5,030,963  7/1991  Tadama .

FOREIGN PATENT DOCUMENTS 0508299  10/1992  European Pat. Off. .
0508567  10/1992  European Pat. Off. .
0067032   3/1988  Japan ................................... 455/90
4127723   4/1992  Japan ................................... 379/58

Primary Examiner—Curtis Kuntz
Assistant Examiner—Dwayne D. Bost
Attorney, Agent, or Firm—Young & Thompson

[57] ABSTRACT

A rod antenna is contained to be slant in a housing case, such that a top of the rod antenna is positioned on the side of the housing case remote from a user head, and a bottom of the rod antenna is on the side of the housing case near the user head. The remote and near sides are opposite to each other. When the rod antenna is pulled up out of the housing case, the rod antenna top becomes more remote from the user head in accordance with the slantly contained mode.

5 Claims, 5 Drawing Sheets

PORTABLE TELEPHONE SET

FIELD OF THE INVENTION

This invention relates to a portable telephone set, and more particularly to, a portable telephone set having a rod antenna containable in a housing case.

BACKGROUND OF THE INVENTION

A conventional portable telephone set is constructed to contain a transmission and receipt unit for transmitting a speech signal of a user (caller or callee) via a rod antenna and receiving a transmitted signal from the rod antenna, and a speaker unit for converting the received electric signal to a sound signal to be heard by the user in a housing case, wherein the housing case is provided with a speaker portion in the inside of which the speaker unit is positioned, and a microphone portion in the inside of which a microphone unit for converting a sound signal of the user to an electric signal to be supplied to the transmission and receipt unit is positioned, while the rod antenna is contained in the housing case to be pulled out in a direction parallel to a side plane of the housing case in operation and pushed thereinto in the idle state.

In operation, the rod antenna is pulled out from the housing case, and a switch is turned on, respectively, by the user, so that the transmission and receipt of telephone signals are carried via the rod antenna. In this operation state, the housing case is held vertically by the user, such that the speaker portion is in contact with an ear of the user, and the microphone portion is in the vicinity of a mouth of the user. Consequently, the rod antenna extends vertically to be partially positioned on the side of a head of the user.

In the conventional portable telephone set, however, there is a disadvantage in that electric signals transmitted from and received by the rod antenna are absorbed by the head of the user, thereby resulting in the decrease of a gain for the rod antenna. As a result, a communication area of the portable telephone set becomes narrow. Further, there is possibility in which a line connection is turned off instantly, when the speaker portion becomes contact with the ear of the user, even if the telephone set is turned on by receiving a call signal.

SUMMARY OF THE INVENTION

Accordingly, it is an object of the invention to provide a portable telephone set in which a rod antenna pulled out from a housing case is not in contact with a head of a user.

It is a further object of the invention to provide a portable telephone set in which a rod antenna is pulled out to extend with a predetermined distance off the head side of a user.

It is a still further object of the invention to provide a portable telephone set by which a communication area becomes wide.

It is a still yet further object of the invention to provide a portable telephone set which is no longer turned off instantly in contact with an ear of a user, when it is turned on by receiving a call signal.

According to the invention, a portable telephone set, comprises:

a housing case for containing telephone communication units, the housing case having at least a speaker portion which is in contact with an ear of a user in operation, and being of a configuration having a first side plane on which the speaker portion is provided, and a second side plane opposite to the first side plane; and a rod antenna contained in the having case and being pulled up to be extendable from a top plane of the housing case;

wherein the rod antenna is contained to be slant in the housing case, such that a top of the rod antenna is positioned on an inside of the second side plane, and a bottom of the rod antenna is positioned on an inside of the first side plane, whereby the top of the rod antenna is more remote from a head side of the user, as the rod antenna is pulled up out of the housing case.

BRIEF DESCRIPTION OF THE DRAWINGS

The invention will be explained in more detailed in conjunction with the appended drawings, wherein.

DESCRIPTION OF THE PREFERRED EMBODIMENTS

Figure 1A:
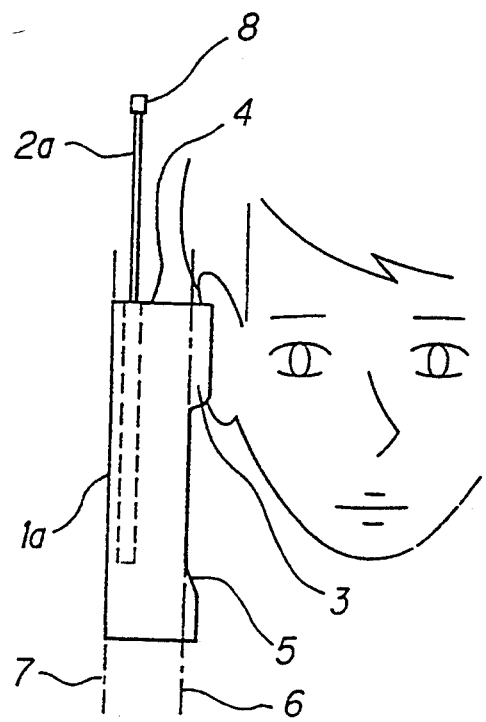
FIG. 1A and 1B are front views showing conventional portable telephone sets.

Before explaining a portable telephone set in the first preferred embodiment, the aforementioned conventional telephone set will be explained in FIGS. 1A and 1B.

The conventional portable telephone set comprises a housing case 1a or 1b having the first side plane 6 on which a speaker portion 3 and a microphone portion 5 are provided, and the second side plane 7 along which a rod antenna 2a or 2b is provided to be contained therein and to be extendable through a top plane 4 in accordance with the manual operation of, for instance, pulling an antenna element 8 upward by a user (other side planes of the housing case 1a or 1b are not explained).

Figure 1B:
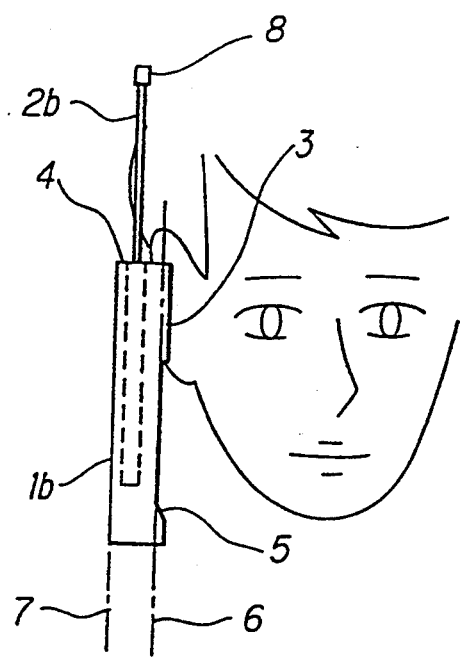

As apparent from the comparison between the illustrations of FIGS. 1A and 1B, the rod antenna 2b tends to be in contact with the head side of the user, as the thickness of the housing case 1b is smaller than that of the housing case 1a in accordance with the improvement of related technologies. The tendency of small size configurations will be more and more enhanced in this field. As a result, the disadvantage, as described before, in which a gain of the rod antenna 2a or 2b is lowered, is observed in the conventional portable telephone set.

Figure 2:
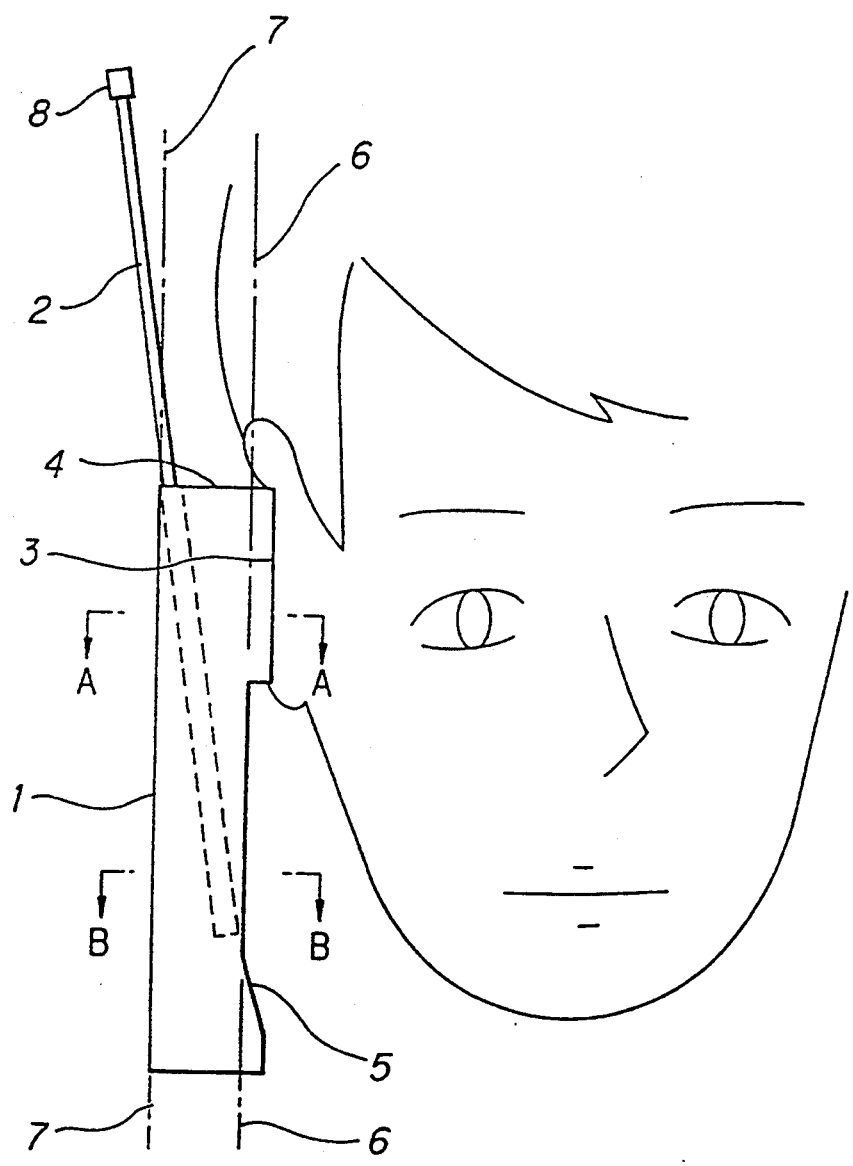
FIG. 2 is a front view showing a portable telephone set in a first preferred embodiment according to the invention.

Next, a portable telephone in the first preferred embodiment will be explained in FIG. 2, wherein like parts are indicated by like reference numerals as used in FIG. 1A and 1B.

In the first preferred embodiment, a rod antenna 2 having an element 8 at the top thereof is contained to be slant in a housing case 1, such that the contained rod antenna 2 is positioned on the inside of the first side plane 6 at the bottom thereof, and on the inside of the second side plane 7 at the top thereof.

Figure 3A:
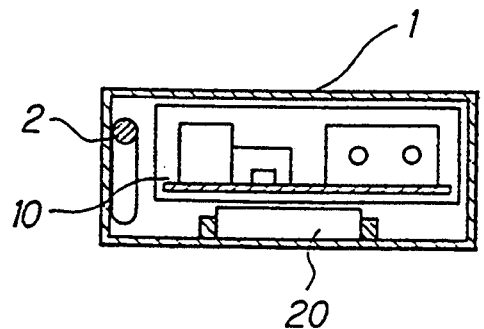
FIG. 3A and 3B are cross sectional views cut along the lines A—A an B—B in FIG. 2.
Figure 3B:
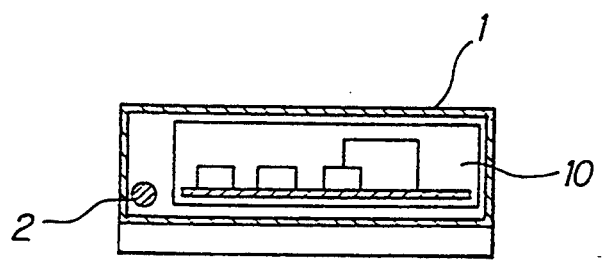
Figure 3C:
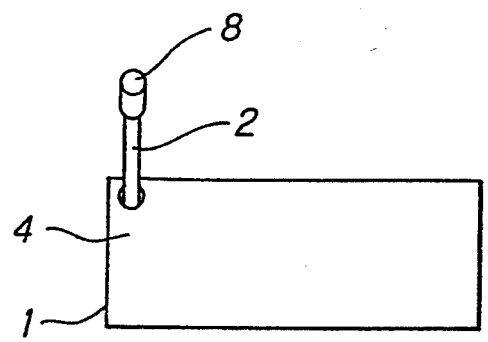
FIG. 3C is a top plane view of FIG. 2.

In FIG. 3A, a transmission and receipt unit 10 and a speaker unit 20 are contained in the housing case 1 together with the slant rod antenna 2, and, in FIG. 3B, the transmission and receipt unit 10 is shown in the housing case 1 together with the rod antenna, while the rod antenna 2 having the element 8 is pulled out to be slant from a top plane 4 of the housing case 1.

In operation, the rod antenna 2 having the element 8 extends upward from the top plane 4 of the housing case 1 by a predetermined slant angle, so that the rod antenna 2 is never in contact with the head side of a user, and has a predetermined distance off the head side in the situation where a speaker portion 3 is in contact with the ear of the user, and the microphone portion 5 is in the vicinity of the mouth of the user.

In accordance with an appropriate distance between the head side of the user and the rod antenna 2, the gain lowering of the rod antenna 2 is precisely avoided.

A portable telephone set in the second preferred embodiment will be explained in FIG. 4, wherein like parts are indicated by like reference numerals as used in FIGS. 1A and 1B, FIG. 2, and FIGS. 3A to 3C.

In the second preferred embodiment, a housing case 1 is indicated into first and second cases 1A and 1B, wherein the first case 1A contains a rod antenna 2 of two steps-shrinkable and expandable type, as clearly illustrated therein, and the second case 1B is connected to the first case 1A by a connection pivot 9.

In the same manner as in the first preferred embodiment, the rod antenna 2 is slant so as to be more remote at the top thereof from the head of the user than at the bottom thereof. Consequently, the same advantage as in the first preferred embodiment is obtained. In addition, a microphone portion 5 can be immediately in front of the mouth of the user in operation by rotating the second case 1B on the connection pivot 9 by a predetermined angle. In the idle state, on the other hand, the first case 1A and the second case 1B are folded, such that the microphone portion 5 is placed on a speaker portion 3 to make the carrying thereof easier.

Figure 4:
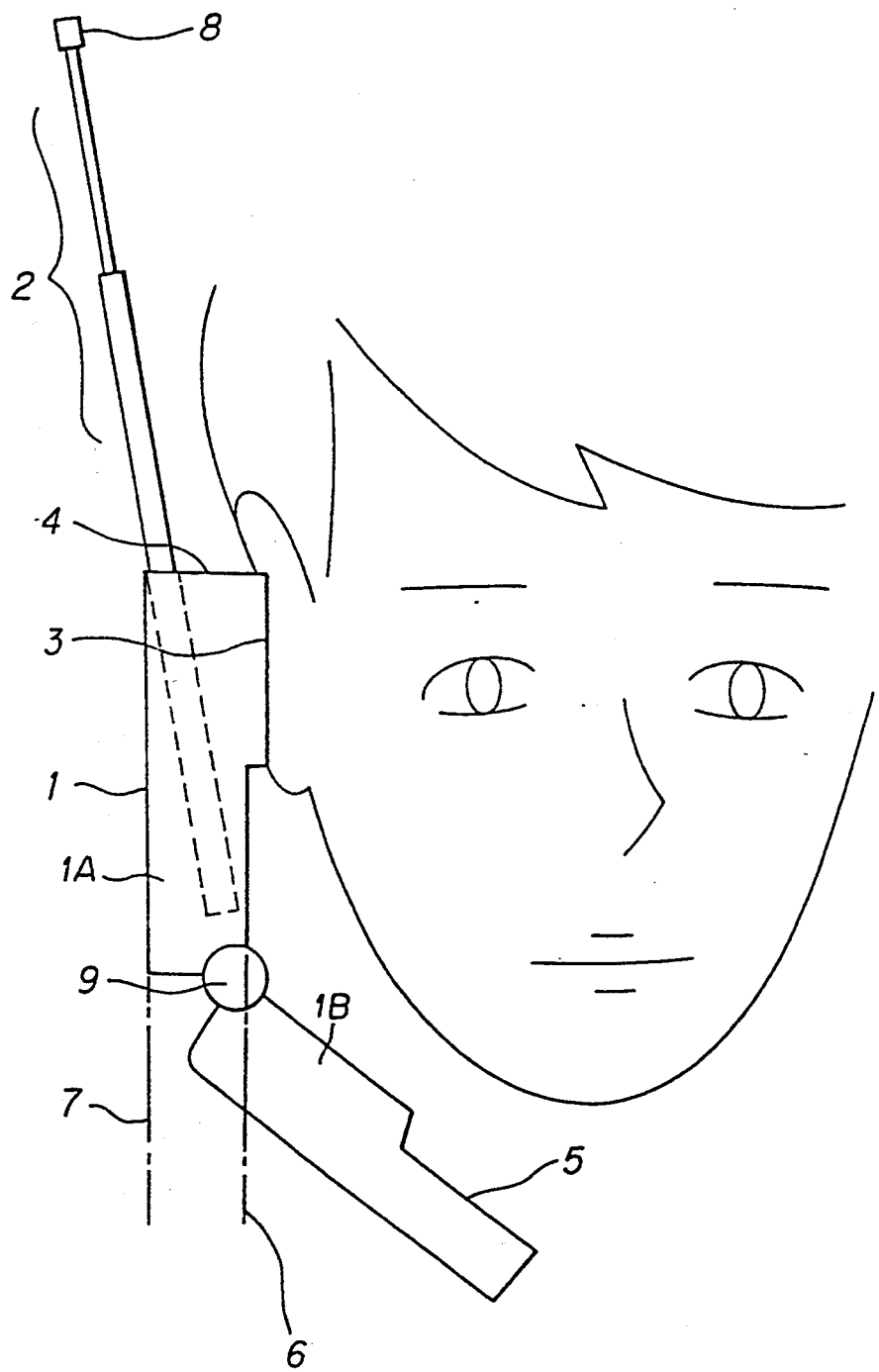
FIG. 4 is a front view showing a portable telephone set in a second preferred embodiment according to the invention.
Figure 5:
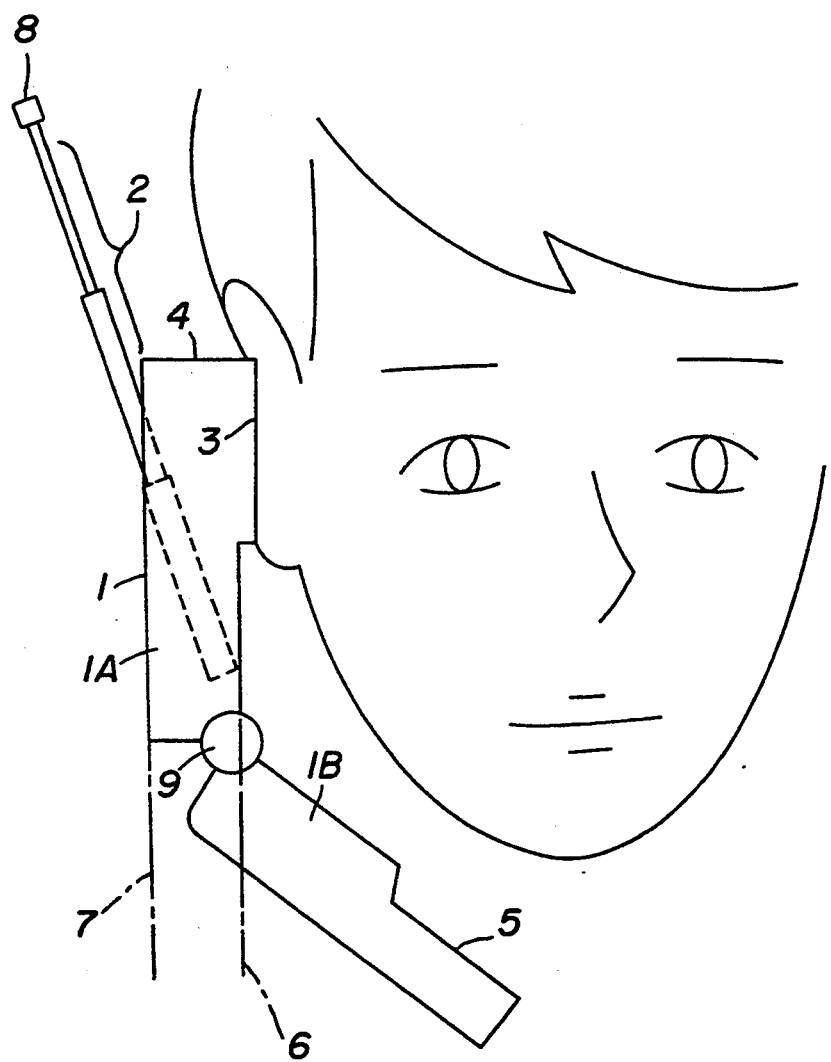
FIG. 5 is a front view showing a portable telephone set in a third preferred embodiment according to the invention.

FIG. 5 shows a portable telephone set in a third preferred embodiment according to the invention, wherein like parts are indicated by like reference numerals as used in FIG. 4.

In the third preferred embodiment, the portable telephone set is different from that in the second preferred embodiment only in that a rod antenna 2 is slant in a first case 1A of a housing case 1 to be extendable through a second side plane 7 thereof.

Although the invention has been described with respect to specific embodiment for complete and clear disclosure, the appended claims are not to be thus limited but are to be construed as embodying all modification and alternative constructions that may be occur to one skilled in the art which fairly fall within the basic teaching here is set forth.

What is claimed is:

1. A portable telephone set, comprising:
   a housing case for containing telephone communication units, said housing case having at least a speaker portion which is in contact with an ear of a user in operation, and being of a configuration having a first side plane on which said speaker portion is provided, and a second side plane opposite to said first side plane; and
   a rod antenna contained in said housing case and being pulled up to be extendable from a top plane of said housing case;
   wherein said rod antenna is contained to be slant in the housing case, such that a top of said rod antenna is positioned on an inside of said second side plane, and a bottom of said rod antenna is positioned on an inside of said first side plane, whereby said top of said rod antenna is more remote from a head side of said user, as said rod antenna is pulled up out of said housing case.

2. A portable telephone set, according to claim 1, wherein:
   said rod antenna is of a multi-steps shrinkable and expandable type.

3. A portable telephone set, according to claim 1, wherein:
   said housing case which is provided with said speaker portion thereon, and a second case which is provided with a microphone portion, said first case and said second case being connected by a connection pivot, so that said second case is rotated on said connection pivot to be immediately in front of a mouth of said user.

4. A portable telephone set, according to claim 3, wherein:
   said speaker portion is convex on said first side plane, and said microphone portion is concave on said first side plane, so that said first and second cases are folded in a manner of said second case on said first case to be contacted with each other by said connection pivot.

5. A portable telephone set, comprising:
   a housing case for containing telephone communication units, said housing case having at least a speaker portion which is in contact with an ear of a user in operation, and being of a configuration having a first side plane on which said speaker portion is provided, and a second side plane opposite to said first side plane; and
   a rod antenna contained in said housing case and being pulled up to be extendable from said second side plane of said housing case;
   wherein said rod antenna is contained to be slant in the housing case, such that a top of said rod antenna is positioned on an inside of said second side plane, and a bottom of said rod antenna is positioned on an inside of said first side plane, whereby said top of said rod antenna is more remote from a head side of said user, as said rod antenna is pulled up out of said housing case.

* * * * *